(12) United States Patent
Anderson

(10) Patent No.: US 6,776,121 B2
(45) Date of Patent: Aug. 17, 2004

(54) LIVESTOCK WATERING METHOD AND APPARATUS

(76) Inventor: James H. Anderson, Box 675, Rimbey, AB (CA), T0C 2J0

( * ) Notice: Subject to any disclaimer, the term of this patent is extended or adjusted under 35 U.S.C. 154(b) by 0 days.

(21) Appl. No.: 10/230,274

(22) Filed: Aug. 29, 2002

(65) Prior Publication Data

US 2003/0056732 A1 Mar. 27, 2003

(30) Foreign Application Priority Data

Aug. 29, 2002 (CA) .............................................. 2356397

(51) Int. Cl.[7] .............................................. A01K 7/06
(52) U.S. Cl. ........................................ 119/75; 119/76
(58) Field of Search .............................. 119/75, 73, 74, 119/76

(56) References Cited

U.S. PATENT DOCUMENTS

| | | | | | |
|---|---|---|---|---|---|
| 607,775 A | * | 7/1898 | Stinson | ...................... | 119/76 |
| 805,617 A | * | 11/1905 | Anderson | ..................... | 119/76 |
| 1,856,582 A | * | 5/1932 | Osse | ............... | 119/76 |
| 2,585,547 A | * | 2/1952 | Harmon | ...................... | 119/75 |
| 2,891,509 A | * | 6/1959 | Baschant | ...................... | 119/75 |
| 3,076,434 A | * | 2/1963 | Niemoller | ..................... | 119/75 |
| 3,318,257 A | * | 5/1967 | Niemoller | ..................... | 119/76 |
| 3,547,083 A | * | 12/1970 | Peterson | ...................... | 119/75 |
| 3,949,707 A | * | 4/1976 | Armstrong et al. | ........... | 119/73 |
| 4,320,720 A | * | 3/1982 | Streed | ............... | 119/73 |
| 4,538,791 A | * | 9/1985 | Wostal | ...................... | 251/339 |
| 4,584,966 A | * | 4/1986 | Moore | ......................... | 119/73 |
| 5,146,873 A | * | 9/1992 | Gray | ........................... | 119/73 |

* cited by examiner

Primary Examiner—Charles T. Jordan
Assistant Examiner—John W. Zerr
(74) Attorney, Agent, or Firm—L. Anne Kinsman; Borden Ladner Gervais LLP

(57) ABSTRACT

The freezeless method for watering livestock, in one embodiment, is a method and means to provide water to livestock using a well, trough and a piston pump that is activated and powered by the animal. The animal uses its nose to push a plate on a lever apparatus that is attached to the pump. The pushing motion causes a rod to move the piston pump, which in turn raises water to the surface via piping into the trough where the animal drinks the water. The animal continues to pump the lever apparatus until the desired amount of water is consumed. By using a drain means and insulation means, the apparatus operates in freezing temperatures without the use of a power or heat source.

6 Claims, 5 Drawing Sheets

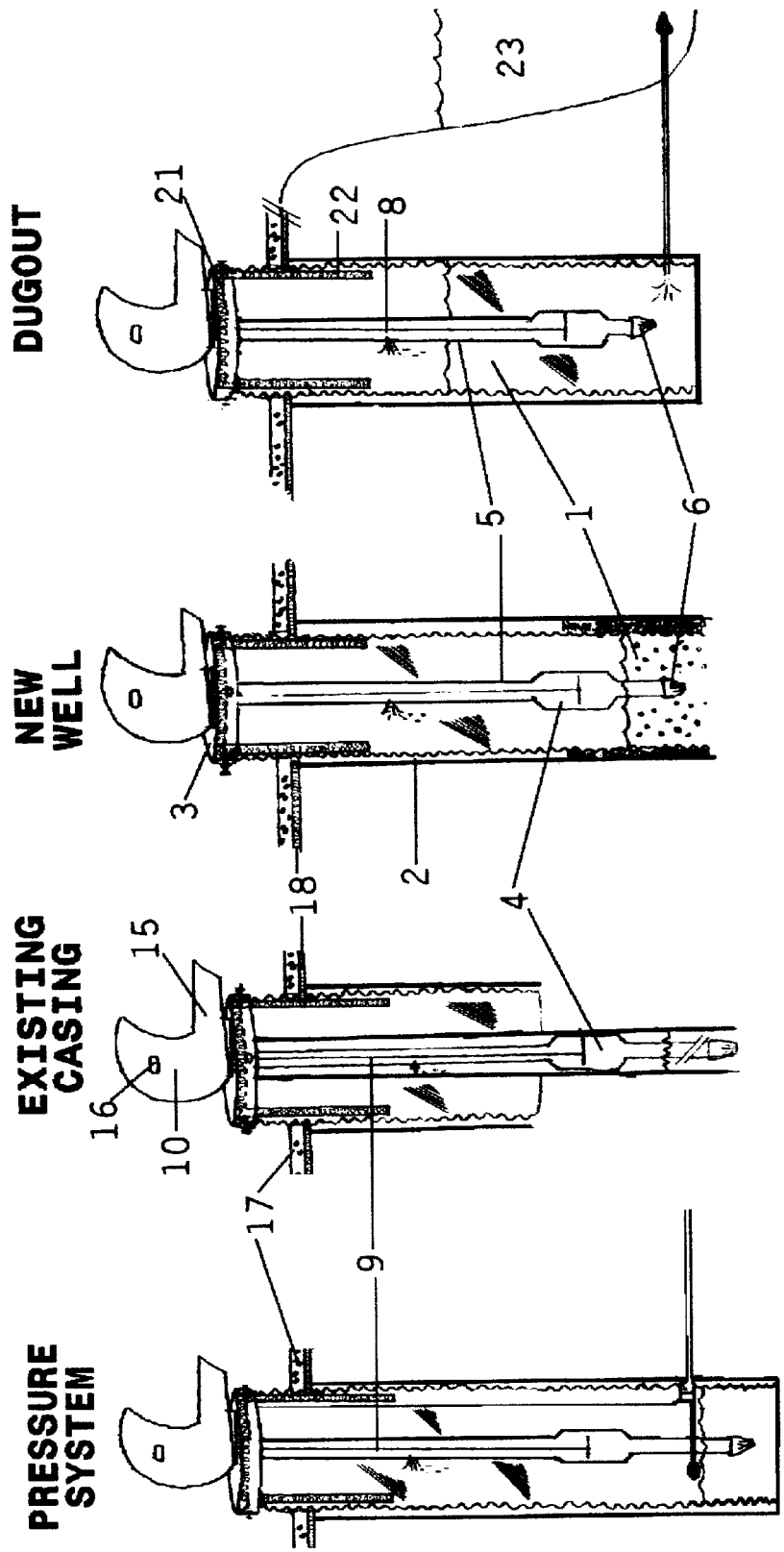
FIGURE ONE (1)

FIGURE TWO (2)
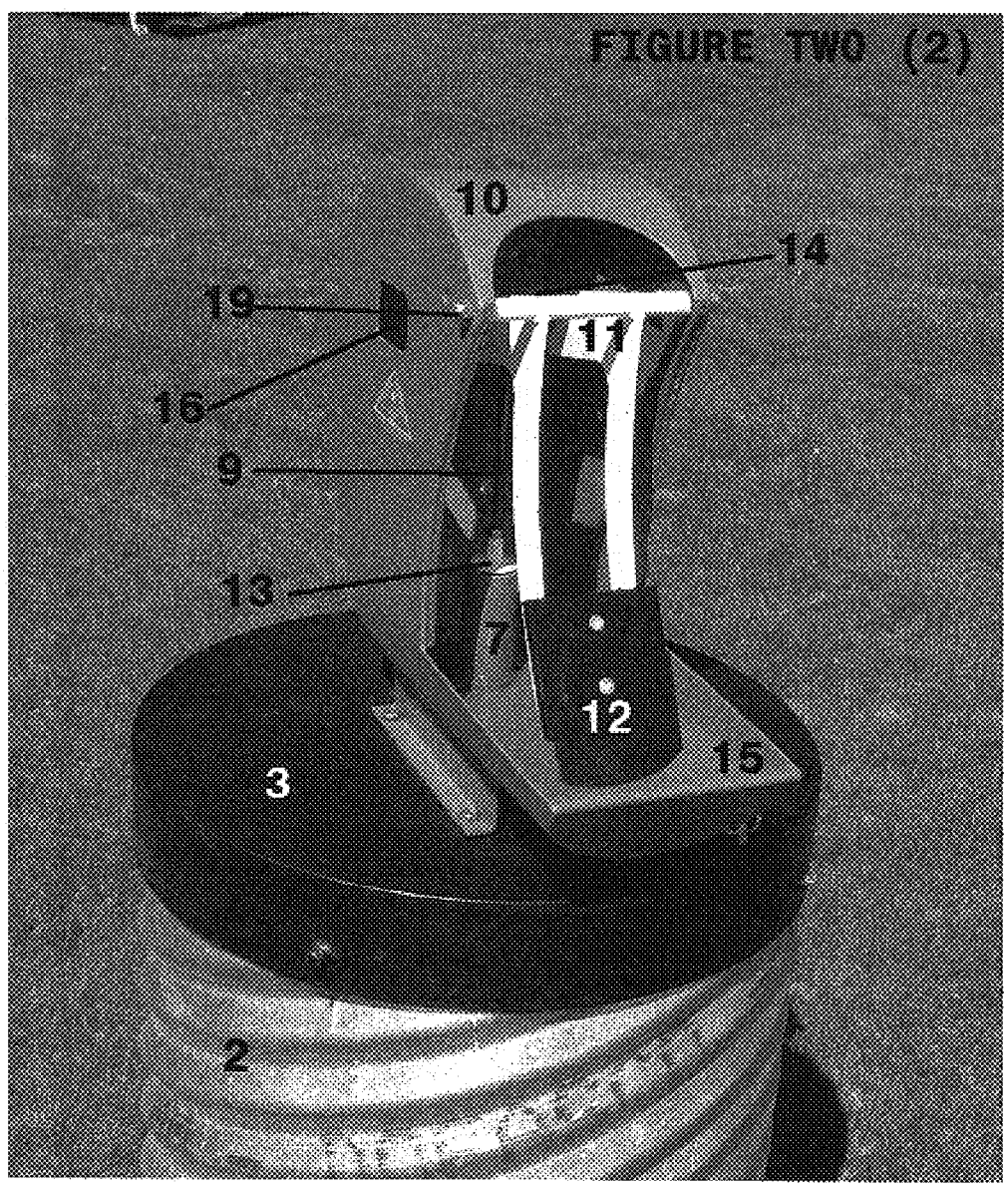

FIGURE THREE (3)
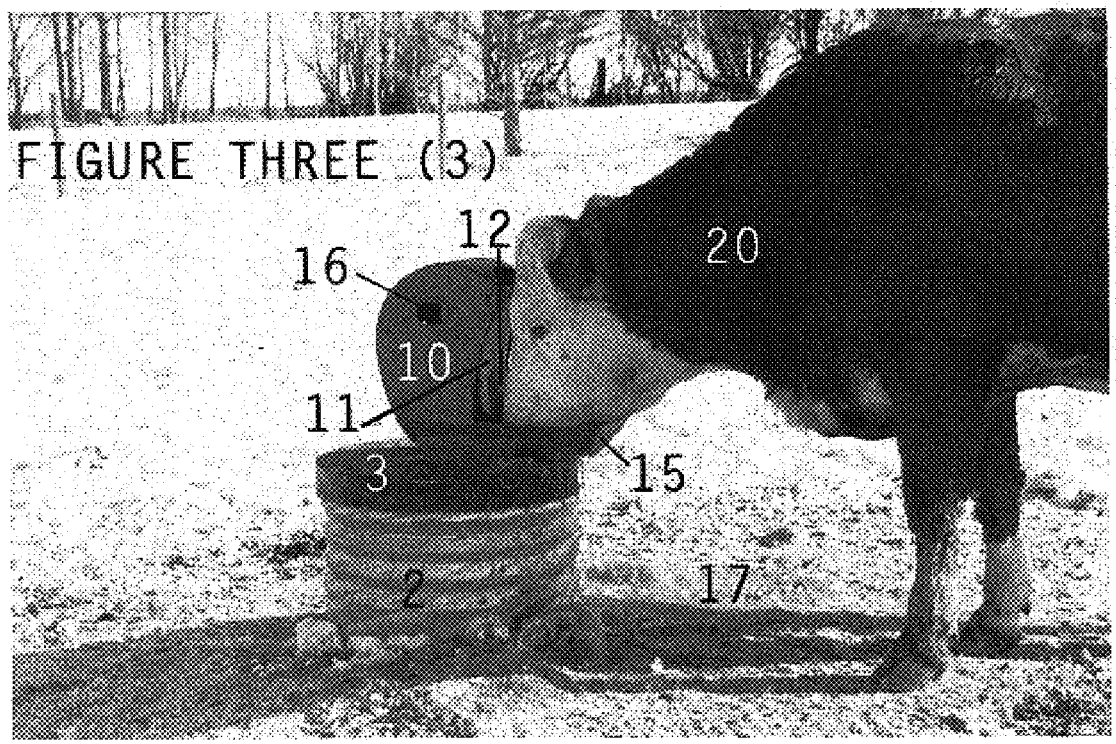
FIGURE FOUR (4)
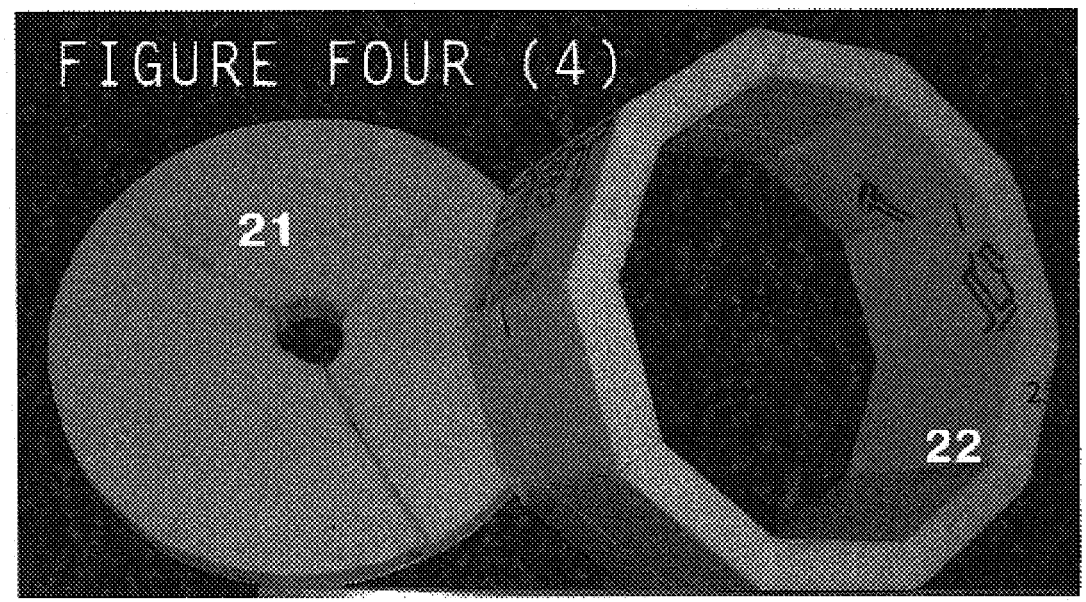

FIGURE FIVE (5)
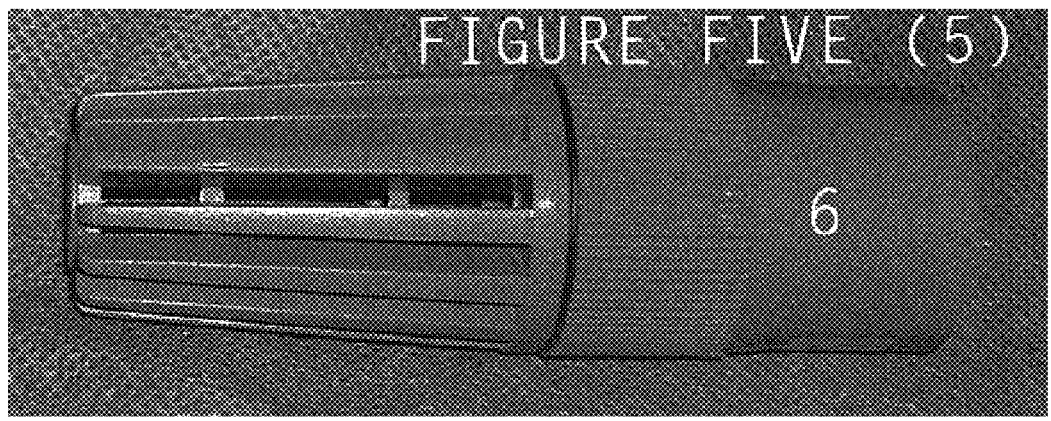

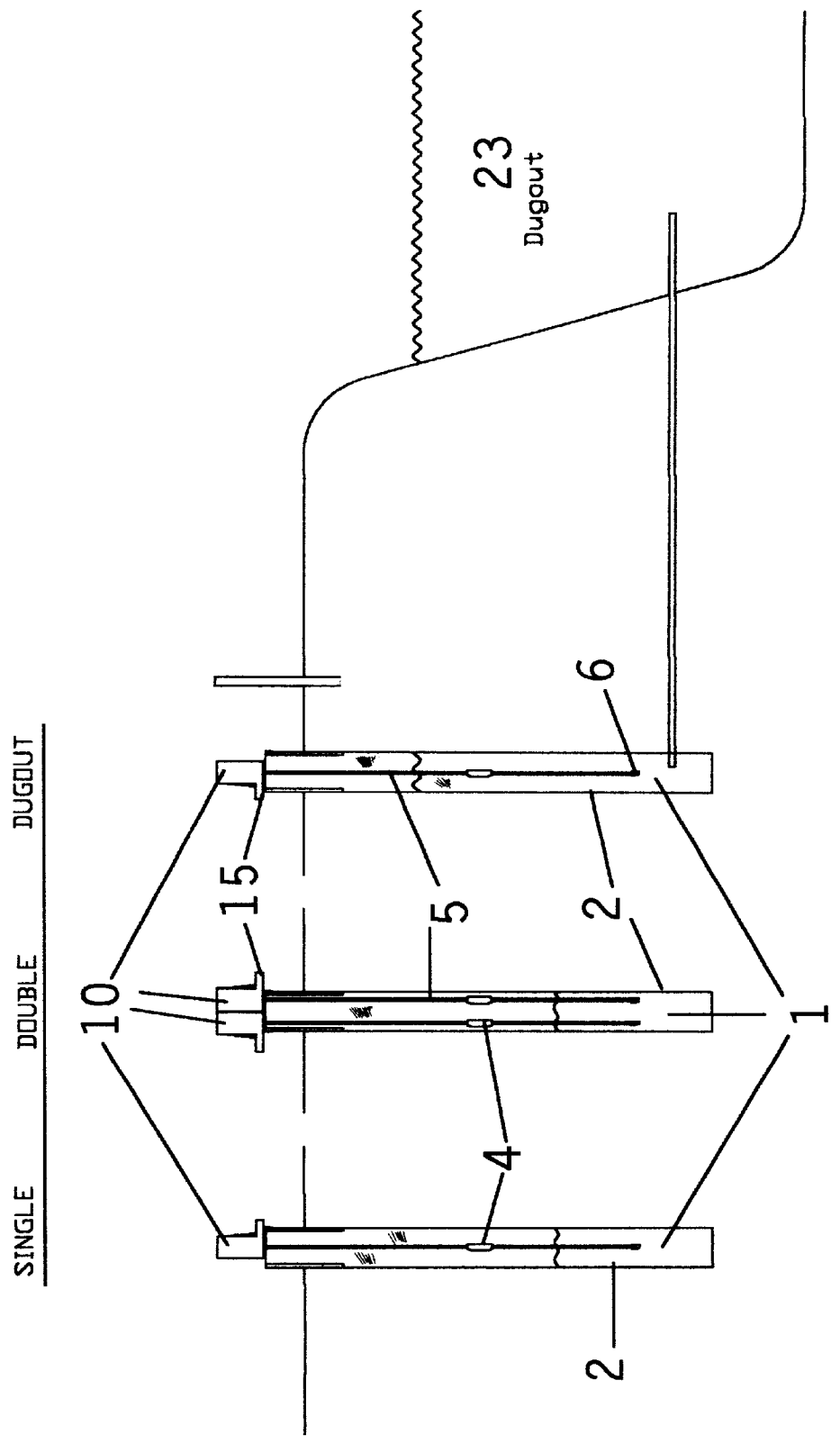
FIGURE SIX (6)

LIVESTOCK WATERING METHOD AND APPARATUS

The present application claims priority from Canadian patent application CA 2356397, filed on Aug. 31, 2001, which is incorporated herein by reference.

FIELD OF THE INVENTION

The Invention relates to the field of animal waterers.

The Invention has particular application in the field of livestock farming, where it is useful to provide water to livestock in remote locations, in various climatic conditions and at all times, without requiring electricity, regular maintenance, large capital investment, large square area, nor supervision or activation by the farmer.

BACKGROUND OF THE INVENTION

It is well-known in the art to use an apparatus or method to provide water and other fluids to domesticated animals. See U.S. Pat. No. 3,683,956, which is comprised of an apparatus for providing a fresh supply of water to small animals on a ground surface, and U.S. Pat. No. 5,934,221, a pet watering device with sensor Also see U.S. Pat. No. 4,757,784, which describes a device for delivering fluid to livestock using a reservoir and gravity.

The use of pumps in combination with water storage tanks or wells has also been used for some time. See U.S. Pat. No. 3,949,707, which provides a livestock watering system comprised of an underground water storage tank with a pump means connecters for pumping water to the ground level, and U.S. Pat. No. 5,221,158, a method and apparatus involving a pump and piping network for raising water from a well and distributing the water at ground level. Also see U.S. Pat. No. 6,055,934, which discloses an animal waterer with drinking fountain and pump.

It is also known to use an animal waterer that is activated or operable by an animal. See U.S. Pat. No. 5,146,873 which provides for an animal operable watering valve connected to a water container and U.S. Pat. No. 4,757,784, a method and means for circulating fluid to livestock involving a drinker actuated by the animal. Also see U.S. Pat. No. 5,934,221, which discloses a device and method for watering a pet involving a sensor that opens a valve when the pet is detected near the device.

SUMMARY OF THE INVENTION

It is an object of the Invention to overcome limitations in the prior art of water pumps and troughs that require electricity and/or human activation and supervision, without resorting to complex and expensive pumping mechanisms, sensors, valves and intricate piping to provide water to animals. The existing prior art inadequately addresses the need for an animal waterer that is relatively inexpensive, can be located in remote areas, does not require a large geographical area and does not require electricity, or human activation or supervision.

The Invention relates generally to an apparatus for providing water to animals, preferably livestock, at a watering location. The Invention has particular application (but is not thereby limited) in the field of cattle farming, where it is particularly beneficial to the farmer to have the ability to provide water to cattle at all hours, in remote watering locations and in various weather conditions, without requiring the presence of the farmer to monitor the water level or activate the pump to fill the trough, nor the need for electricity, large capital investment, large geographic area or ongoing maintenance.

In one aspect, the invention is an animal operable watering device for causing water to be pumped from a water source, the water source having a pumping system for delivering water to the watering device. The watering device comprises a trough having an inlet for inflow of water, and a hood for sheltering and protecting the trough and its contents; a drain back prevention mechanism located at the inlet of the trough for permitting one way flow from the inlet and preventing draining of water from the trough back into the water source; piping attached to the trough such that a first end of the piping is in communication with the inlet of the trough and a second end of the piping is connected to the pumping system, the piping having a drain hole located beneath the level of the drain back prevention mechanism for draining water from the piping back into the water source; and a pump actuator operatively attached to the trough for actuation by the nose of an animal, and communicating with the mechanical pumping system, whereby actuation operates the mechanical pumping system which causes water to flow through the drain back prevention mechanism to the trough from the trough inlet, thereby delivering water from the water source through the piping and into the trough while preventing the outflow of water from the trough to the water reservoir.

In one embodiment, the pump actuator includes a lever and acrylic plate, the lever mounted to the hood such that the lever can be reciprocated by an animal between a first position and a second position, operating the pumping system to deliver water from the water source to the trough through the drain back prevention mechanism. The pumping system associated with the water source may include a nitrile cup for reducing the pressure required by an animal to operate the lever.

In another aspect, the invention is a livestock watering apparatus for providing water to an animal at a watering location. The apparatus comprises: a water discharge device having a trough, an inlet for inflow of water, a drain back prevention mechanism for permitting one way flow of water into the trough through the inlet and preventing water from draining from the trough, and a hood mounted upon the trough for providing shelter and protection to the trough and its contents; a well having a water reservoir, a well cover, and a well shaft, the well shaft extending from the well reservoir towards the water discharge device; insulating means mounted within the well shaft and beneath the well cover for insulating the well from freezing temperatures; piping suspended within the well and through the well cover such that the first end of the piping is located proximal to the water reservoir and the second end of the piping is in communication with the water discharge device, the piping having a drain hole below the level of the drain back prevention mechanism for draining water from the piping into the water reservoir; a pumping system of the type that is operable by the reciprocation of a pumping rod, the pumping system attached to the first end of the piping such that the pumping system is in communication with the water reservoir and the pumping rod extends within the piping towards the water discharge device, the pumping system including a nitrile cup to reduce the friction associated with reciprocating the pumping rod and thereby decreasing the energy required to reciprocate the pumping rod; and a lever and acrylic plate operably attached to the water discharge device for operation by an animal between a first and second position, the lever operably connected to the pumping rod such that operation of the lever between said first and second positions reciprocates the pumping rod, thereby operating the pumping system and delivering water from the water source through the piping and the drain back prevention mechanism to the trough of the water discharge device.

The water reservoir of the present invention can be any water source from which water can be pumped to a watering location, and is preferably a natural aquifer, trenched dugout, or water tank. The well described in association with the present invention will therefore comprise the water reservoir (water source), and an associated shaft or culvert through which water may travel to the watering location.

The term pumping system as used herein is intended to mean a piston-type pump and pump housing, and also includes any associated intake piping and intake valve that may extend into the water reservoir.

The piping that delivers water from the pump to the water discharge device is of any type which can accomodate the flow of an appropriate amount of water for delivery to animals. In accordance with the invention, a drain hole is provided within the piping. The drain hole is intended to include the embodiments of a drain pipe or drain valve, or other known means of draining water from a portion of the pipe to prevent freezing. The drain hole should be located below the watering location, preferably at least 5 feet below the lid (which is approximately 3 feet below ground level). The preferred depth of the drain hole will vary considerably from region to region. A deeper location for the drain hole will necessitate an increased number of strokes to initiate water flow to the trough, however, in order to ensure that freezing of water within the pipe does not occur, the drain hole is located at least as deep as necessary to prevent freezing of water within the piping. The inventors have found that a depth of at least 3 feet below ground surface is optimal. The drain hole should be small enough such that draining occurs at a rate which is slower than the rate at which water can be pumped by an animal, or otherwise permits complete drainage of the pipe above the hole when the pump is not being operated.

These and other objects and advantages of the Invention are apparent in the following descriptions of the preferred embodiments of the Invention, which are not intended to limit in any way the scope or the claims of the Invention. In preferred embodiments of the present invention, particular improvements and advantages of the present invention include.

1) Optimized size, shape and weight of hood
   to: allows installation without the use of heavy equipment,
   eliminate corners that animals can rub on which could damage the facility; and
   to prevent birds from perching on top and contaminating the water in the water discharge device.

2) The drain back prevention means makes the invention acceptable environmentally. Without it, the saliva of watering animals could drain back into the water source, contaminating the water in the well and possibly acquifers that would impact neighboring wells.

3) An insulation system to prevent freezing of the piping and the water in the well. Without this system, the device has proven to freeze up in harsh climates. This includes an insulation sleeve and lid in the culvert and insulation under the surrounding pad.

4) The drain means in one embodiment is a $7/64$ inch hole drilled into the piping 5 feet below the lid.

5) A two-position system for the pump actuator allows for a greater mechanical advantage for deeper wells.

6) Two sizes of pumping means have been developed to accommodate for deeper wells.

7) A nitrile cup has been incorporated in the pumping system which creates less drag, thus requiring less pressure by the animal to do the pumping. This cup will also last much longer than a leather cup in the pumping system.

8) The recommendation of a cement pad surrounding the culvert, incorporating a frost barrier between the culvert and the cement pad, is another environmental consideration to prevent contamination of the water source.

9) Where a large number of animals require it, two or more pumping units are assembled on one lid.

DESCRIPTION OF THE INVENTION

BRIEF DESCRIPTION OF DRAWINGS

FIG. One (1) is a cross-sectional view of the preferred embodiment of the Invention (not to scale) showing four types of applications.

FIG. Two (2) is a perspective view of the preferred embodiment of the Invention.

FIG. Three (3) is a side view of the preferred embodiment of the Invention in use.

FIG. Four (4) is a perspective close-up view of the insulation lid 21 and sleeve 22 used in the Invention.

FIG. Five (5) is a perspective close-up view of the intake valve 6.

FIG. Six (6) is a cross-sectional view of the preferred embodiment of the Invention (to scale), showing a single, double and dugout installation.

DETAILED DESCRIPTION OF THE PREFERRED EMBODIMENT

The preferred embodiment of the Invention is a method and means comprised of a well 1 or other water source, culvert 2, lid 3, pumping system 4, piping 5, intake valve 6, drain back prevention mechanism 7, drain hole 8, pumping rod 9, hood 10, lever 11, plate 12, trough 15, suspending and access means 16, platform 17, insulation pad 18, insulation lid 21, insulation sleeve 22, and dugout 23. The preferred embodiment of the Invention uses a well 1 created by drilling into a ground water source or trenching from a dugout 23.

FIG. One (1) illustrates a cross-section of the preferred embodiment of the Invention (not to scale) comprised of well 1, culvert 2, lid 3, pumping system 4, piping 5, intake valve 6, drain means 8, pumping rod 9, hood 10, trough 15, suspending and access means 16, platform 17, insulation pad 18, insulation lid 21, insulation sleeve 22 and dugout 23.

Having reference also to FIG. 3, the pumping system 4, pumping rod 9, and piping 5 are placed in a vertical position within the culvert 2 so that the intake valve 6 is immersed in the well 1 and the drain back prevention means 7 (shown in FIG. 2) is positioned such that the water from the well 1 is drawn through the intake valve 6, through the piping 5 through the drain back prevention mechanism 7 and into the trough 15. The drain back prevention mechanism 7 is attached at the top end of the piping 5 such that the water in the trough 15 does not re-enter the well 1 and possibly contaminate the water in the well 1. However, the water in the piping 5 below the drain back prevention mechanism 7 does drain back into the well 1 down to the level of the drain means 8. An insulation lid 21 and sleeve 22 is inserted into the culvert 2 to prevent freezing. A hood 10 is placed on the lid 3 around the lever 11. The lever 11 is attached to the pumping rod 9 by means of the connecting device 14 and the hood 10 by means of the connecting bolt 19. The lower end of the pumping rod 9 is attached to the pumping system 4. The plate 12 is attached to the lever 11. The drain back prevention mechanism 7 also prevents the lever 11 from contacting the pumping rod 9. The suspending and access device 16 is cut in the sides of the hood 10 for the purpose of suspending the assembled pump system during maintenance and to access the pumping rod 9 during assembly. The water in the well 1 can come from a natural aquifer in the ground or by trenching from a dugout 23.

FIG. Two (2) illustrates a side view of the preferred embodiment of the Invention, comprised of culvert 2, lid 3, drain back prevention means 7, pumping rod 9, hood 10, lever 11, plate 12, rod stop 13, connecting device 14, trough 15, suspending and access device 16 and connecting bolt 19.

A hood 10 is placed on the lid 3 around the lever 11. The lever 11 is attached to the pumping rod 9 by the connecting device 14 and to the hood by the connecting bolt 19. The plate 12 is attached to the lever 11. A rod stop 13 is attached to the pumping rod 9 to position the lever 11 and plate 12 appropriately for the animal 20 to pump water.

FIG. Three (3) illustrates the preferred embodiment of the Invention in use by an animal 20, comprised of culvert 2, lid 3, hood 10, lever 11, plate 12, trough 15, suspending and access means 16, platform 17.

With reference to FIGS. 1 and 2, a hole of suitable diameter is drilled into the ground until water is reached, or trenching is completed from a dugout 23, creating a well 1. The culvert 2 is inserted into the hole so that it stands in a vertical position. The pumping system 4, pumping rod 9, and piping 5 are inserted into the culvert 2, so that the intake valve 6 is immersed in the water contained in the well 1. The drain back prevention mechanism 7 is positioned on top of the piping 5 so that the water from the well 1 can be pumped by the pumping system 4, through the piping 5, via the pumping rod 9 through the drain back prevention mechanism 7 and into the trough 15. The culvert 2 and lid 3 are insulated to prevent the water from freezing while in the piping 5. A lid 3 is placed on top of the culvert 2. A hood 10 is placed over the lever 11 and fastened to the lid 3. The trough 15 and hood 10 are attached to the lid 3 which is attached to the culvert 2 at a height suitable for the animal 20 to drink. The culvert 2, lid 3, hood 10, and trough 15 are of a durable steel material, to endure the pressure exerted by the animal 20 on these components, and to protect the lever 11 and pumping rod 9 from damage. The drain back prevention mechanism 7, hood 10, lever 11, rod stop 13, and trough 15 are powder coated to prevent rusting in the outdoor environment. The lever 11 with plate 12 is attached to the pumping rod 9 and the hood 10. A platform 17 should be placed around the culvert 2 to reduce the effect of the spilled water such as the creation of puddles and holes caused by hoof action near the culvert 2, to prevent any spilled water from seeping through the ground and contaminating the well 1, and to prevent the pressure of the weight of the animal 20 from driving the frost down to a level that might freeze the water in the well 1. The animal 20 steps onto the platform 17 and places its nose and mouth in the trough 15. The animal 20 pushes the plate 12 attached to the lever 11 and the pumping rod 9 which activates the pumping system 4. The plate 12 is of an acrylic material to increase the comfort of the animal 20 when pushing the plate 12 and prevent the wet nose of the animal 20 from adhering to the cold plate 12 in lower temperatures. The pumping system 4 intakes water through the intake valve 6 and pushes the water through the piping 5 through the drain back prevention mechanism 7. The water travels through the drain back prevention mechanism 7 and to the trough 15. The animal 20 continues pushing the plate 12 which operates the pumping system 4 until it has finished drinking. The drain back prevention mechanism 7 prevents the water contained in the trough 15 from returning to the well 1 and contaminating the water in the well 1. The drain hole 8 in the piping 5 allows water in the piping 5 below the drain back prevention mechanism 7 to drain back into the well 1 down to the level of the drain hole 8 when the animal 20 stops pushing the plate 12. This prevents the water from remaining in the piping 5 and freezing in cold temperatures.

FIG. Four (4) illustrates the preferred embodiment of the insulation lid 21 and insulation sleeve 22.

With reference also to FIG. 1, the insulation sleeve 22 of at least four feet in length, and preferable eight feet in length, is placed into the culvert 2. The insulation lid 21 is fitted on top of the insulation sleeve 22 prior to placement of the lid 3. This helps prevent freezing of the pumping rod 9 and the piping 5 as well as the water in the well 1.

FIG. Five (5) illustrates the preferred embodiment of the intake valve 6.

With reference also to FIG. 1, the intake valve 6 is attached to the piping 5. This intake valve 6 must be within the water in the well 1 in order for the Invention to pump water.

FIG. Six (6) illustrates a cross-sectional of the preferred embodiment of the Invention comprised of well 1, culvert 2, pumping system 4, piping 5, intake valve 6, hood 10, trough 15, and dugout 23.

All components of the Invention may be comprised of any device and material suitable, including but not limited to a piston pump for the pumping mechanism, ABS plastic for the external parts of the pumping system, cast aluminum and nitrile for the inner parts of the pumping system, ABS plastic piping, steel for the culvert, lid, drain back prevention mechanism, pumping rod, lever, rod stop, trough and hood, Styrofoam for the insulation, acrylic for the plate, stainless steel for the connecting device and connecting rod, and cattle or bison for the animal.

In the foregoing Description, the Invention has been described in its preferred embodiments. However, it will be evident that various modifications and changes may be made without departing from the broader scope and spirit of the Invention. Accordingly, the present specifications and embodiments are to be regarded as illustrative rather than restrictive.

The descriptions here are meant to be exemplary and not limiting. It is to be understood that a reader skilled in the art will derive from this descriptive material the concepts of this Invention, and that there are a variety of other possible implementations; substitution of different specific components for those mentioned here will not be sufficient to differ from the Invention described where the substituted components are functionally equivalent.

The embodiments of the invention in which an exclusive property or privilege is claimed are defined as follows:

1. An animal operable watering device for causing water to be pumped from a water source, the water source having a mechanical pumping system for pumping water to the watering device, the watering device comprising:

a trough having an inlet for inflow of water, and a hood for sheltering and protecting the trough and its contents;

a drain back prevention mechanism located at the inlet of the trough for permitting one way flow from the inlet to the trough and preventing draining of water from the trough back into the water source;

piping attached to the trough such that a first end of the piping is in communication with the inlet of the trough and a second end of the piping is connected to the mechanical pumping system, the piping having a drain hole located beneath the level of the drain back prevention mechanism for draining water from the piping into the water source; and a pump actuator operatively attached to the trough for actuation by the nose of an animal, and communicating with the mechanical pumping system, whereby actuation operates the mechanical pumping system which in turn flows water through the drain back prevention mechanism to the trough from the trough inlet, thereby delivering water from the water source through the piping and into the trough while preventing outflow of water from the trough to the water reservoir.

2. A livestock watering apparatus according to claim 1, wherein the drain hole is located at least three feet below the surface of the ground.

3. A livestock watering apparatus according to claim 1, wherein the pump actuator includes a lever mounted to the hood such that the lever can be reciprocated by an animal between a first position and a second position, operating the pumping system and disengaging the drain back prevention mechanism to deliver water from the water source to the trough.

4. A livestock watering apparatus according to claim 3 wherein the lever includes an acrylic plate to prevent freezing of the nose of the animal to the lever.

5. A livestock watering apparatus according to claim 1, wherein the pumping system includes a nitrile cup for reducing the pressure required by an animal to operate the pump actuator.

6. A livestock watering apparatus for providing water to an animal at a watering location, comprising:

a. a water discharge device having a trough, an inlet for inflow of water, a drain back prevention mechanism for engaging the inlet to prevent water from draining from the trough, and a hood mounted upon the trough for providing shelter and protection to the trough and its contents;

b. a well having a water reservoir, a well cover, and a well shaft, the well shaft extending from the well reservoir towards the water discharge device;

c. insulating means mounted within the well shaft and beneath the well cover for insulating the well from freezing temperatures;

d. piping suspended within the well and through the well cover such that the first end of the piping is located proximal to the water reservoir and the second end of the piping is in communication with the water discharge device, the piping having a drain hole below the level of the drain back prevention mechanism for draining water from the piping into the water reservoir;

e. a pumping system of the type that is operable by the reciprocation of a pumping rod, the pumping system attached to the first end of the piping such that the pumping system is in communication with the water reservoir and the pumping rod extends within the piping towards the water discharge device, the pumping system including a nitrile cup to reduce the friction associated with reciprocating the pumping rod and thereby decreasing the energy required to reciprocate the pumping rod; and f. a lever and acrylic plate operably attached to the water discharge device for operation by the nose of an animal between a first and second position, the lever operably connected to the pumping rod and to the drain back prevention mechanism such that operation of the lever between said first and second positions disengages the drain back prevention mechanism and reciprocates the pumping rod, thereby operating the pumping system and delivering water from the water source through the piping and to the trough of the water discharge device.

* * * * *

UNITED STATES PATENT AND TRADEMARK OFFICE
CERTIFICATE OF CORRECTION

| | | |
|---|---|---|
| PATENT NO. | : 6,776,121 B2 | Page 1 of 1 |
| APPLICATION NO. | : 10/230274 | |
| DATED | : August 17, 2004 | |
| INVENTOR(S) | : James H. Anderson | |

It is certified that error appears in the above-identified patent and that said Letters Patent is hereby corrected as shown below:

In the date of Foreign Application Priority Data on the cover page, change "Aug. 29, 2002" to --Aug. 31, 2001--;

Column 7:

Claim 3, line 26, delete "and disengaging the drain back prevention mechanism".

Claim 3, line 28, after "trough", insert --through the drain back prevention mechanism--.

Column 8:

Claim 6, line 1, replace "engaging the inlet" with --permitting one way flow--.

Claim 6, line 31, delete "and to the drain back prevention mechanism".

Claim 6, line 33, delete "disengages the drain back prevention mechanism and".

Claim 6, line 37, replace "to the trough of the water discharge device" with --the drain back prevention mechanism to the trough--.

Signed and Sealed this

Twenty-fourth Day of October, 2006

JON W. DUDAS
*Director of the United States Patent and Trademark Office*